Nov. 22, 1932.  C. B. SHELLMAN  1,888,938
ICE CUTTING MACHINE
Filed Aug. 8, 1932   6 Sheets-Sheet 1
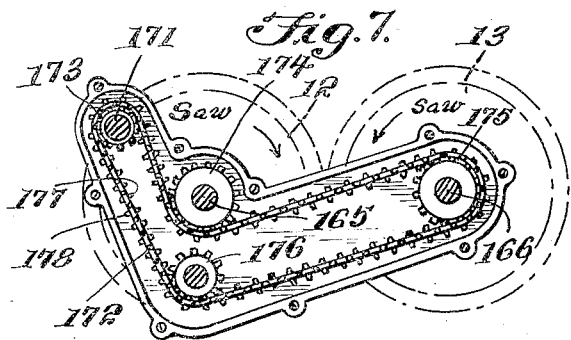
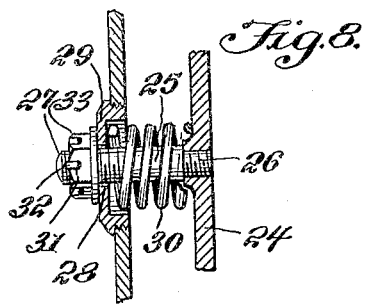
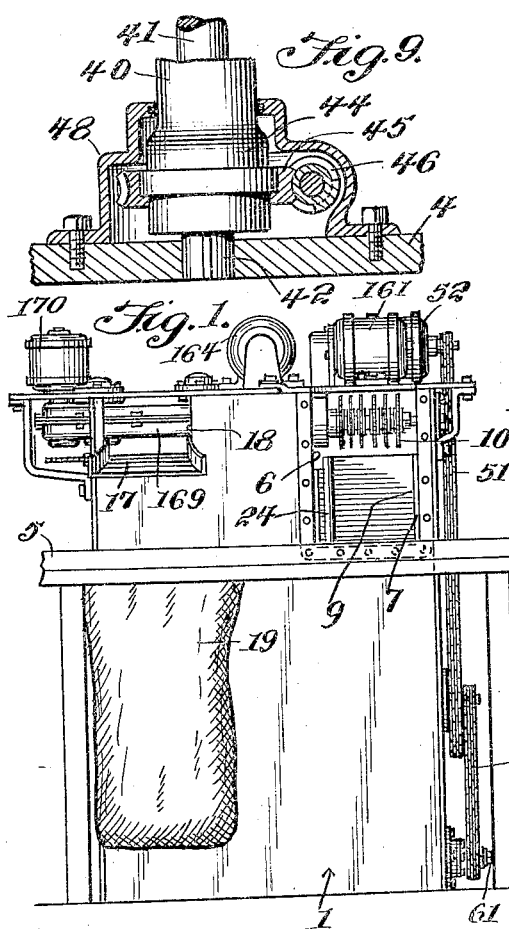
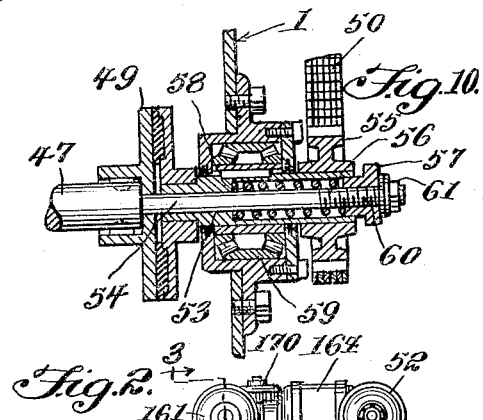
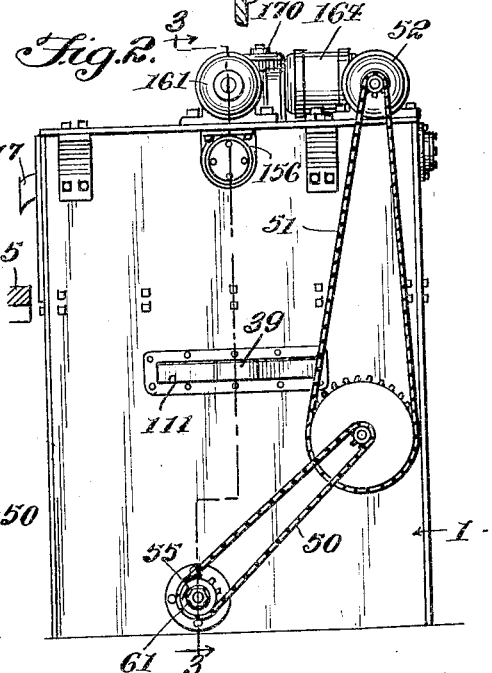
Inventor
Charles B. Shellman
By _____ Attorney

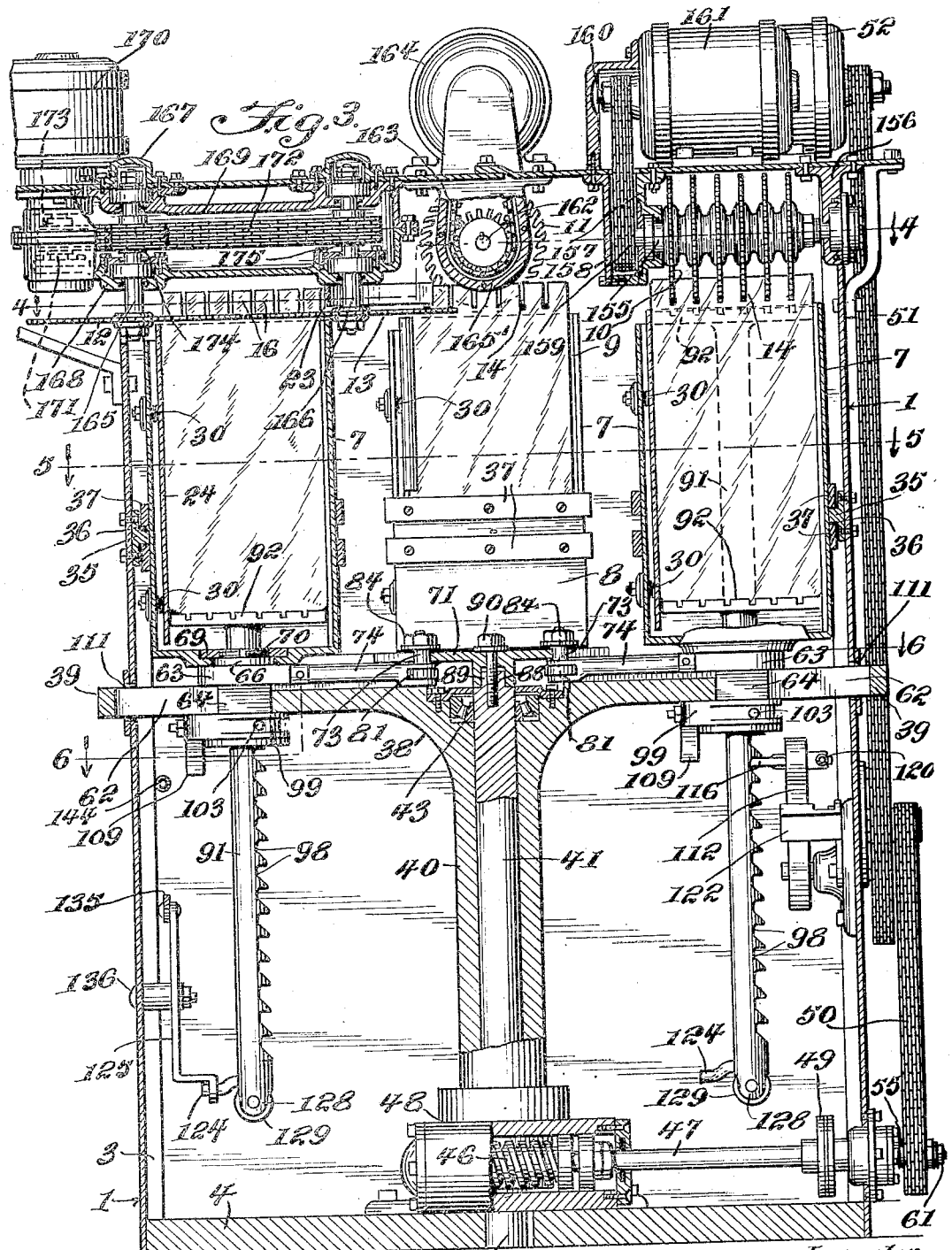

Nov. 22, 1932.        C. B. SHELLMAN        1,888,938
              ICE CUTTING MACHINE
         Filed Aug. 8, 1932      6 Sheets-Sheet 3
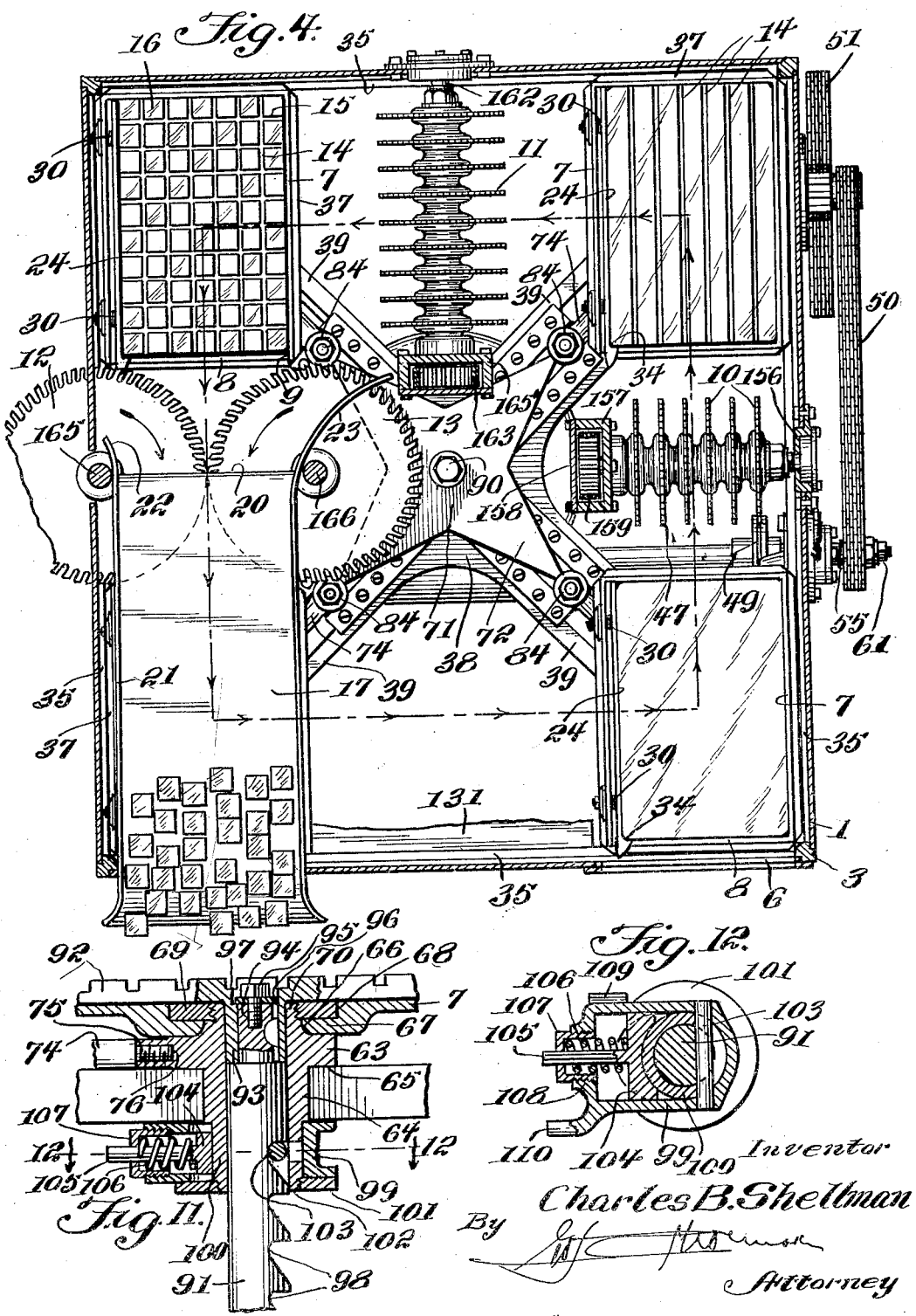
Inventor
Charles B. Shellman
By
Attorney Nov. 22, 1932.  C. B. SHELLMAN  1,888,938
ICE CUTTING MACHINE
Filed Aug. 8, 1932  6 Sheets-Sheet 4
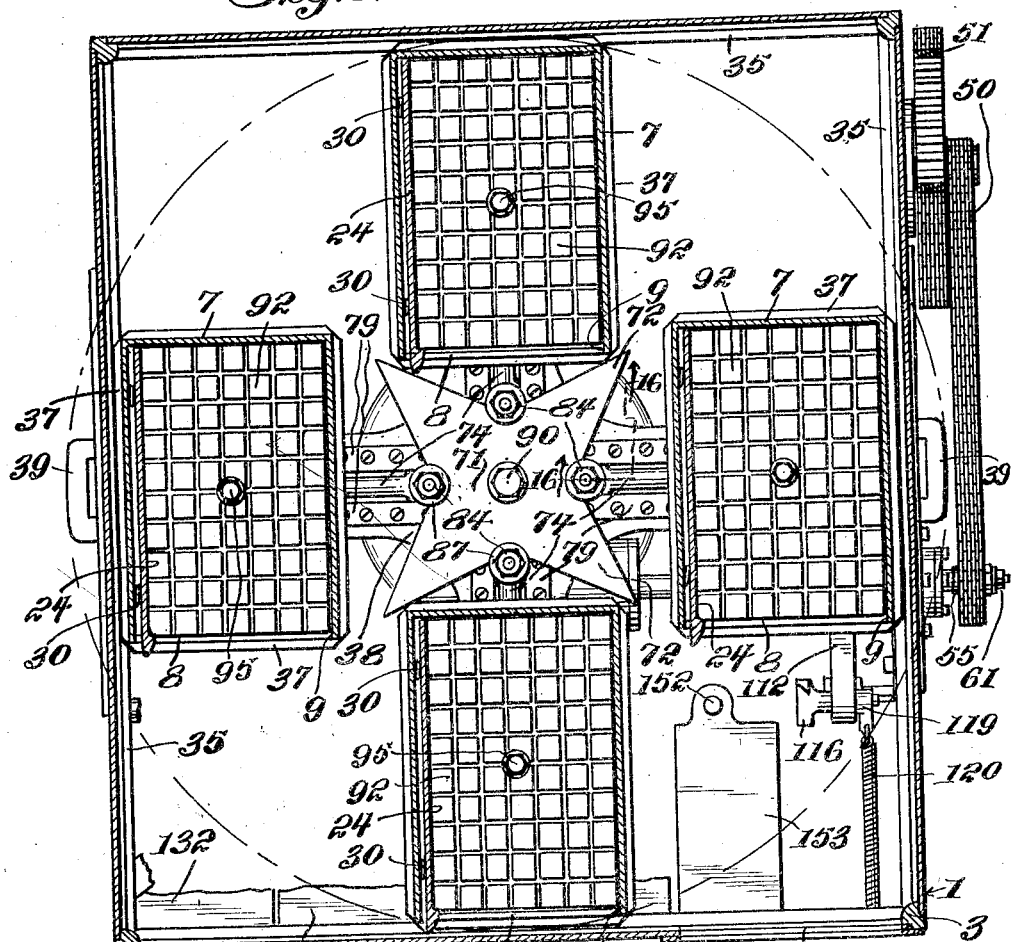
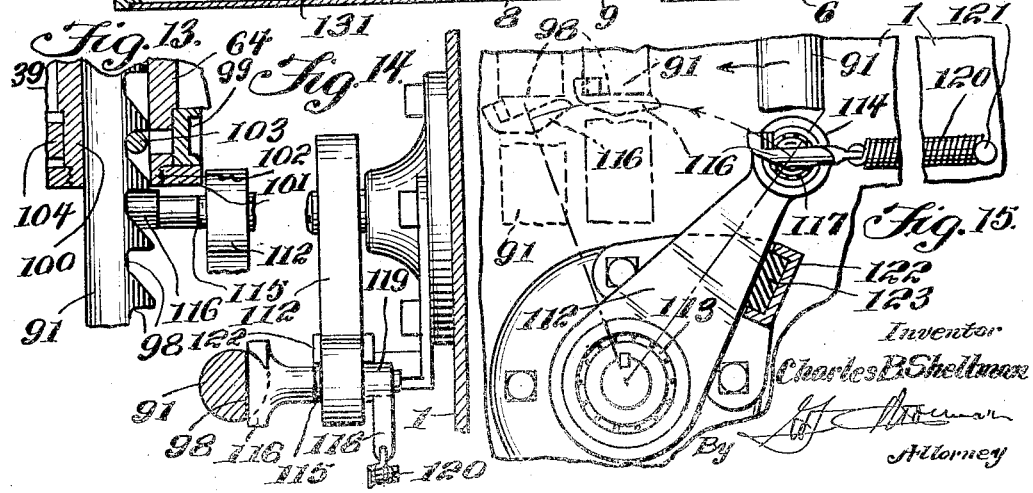

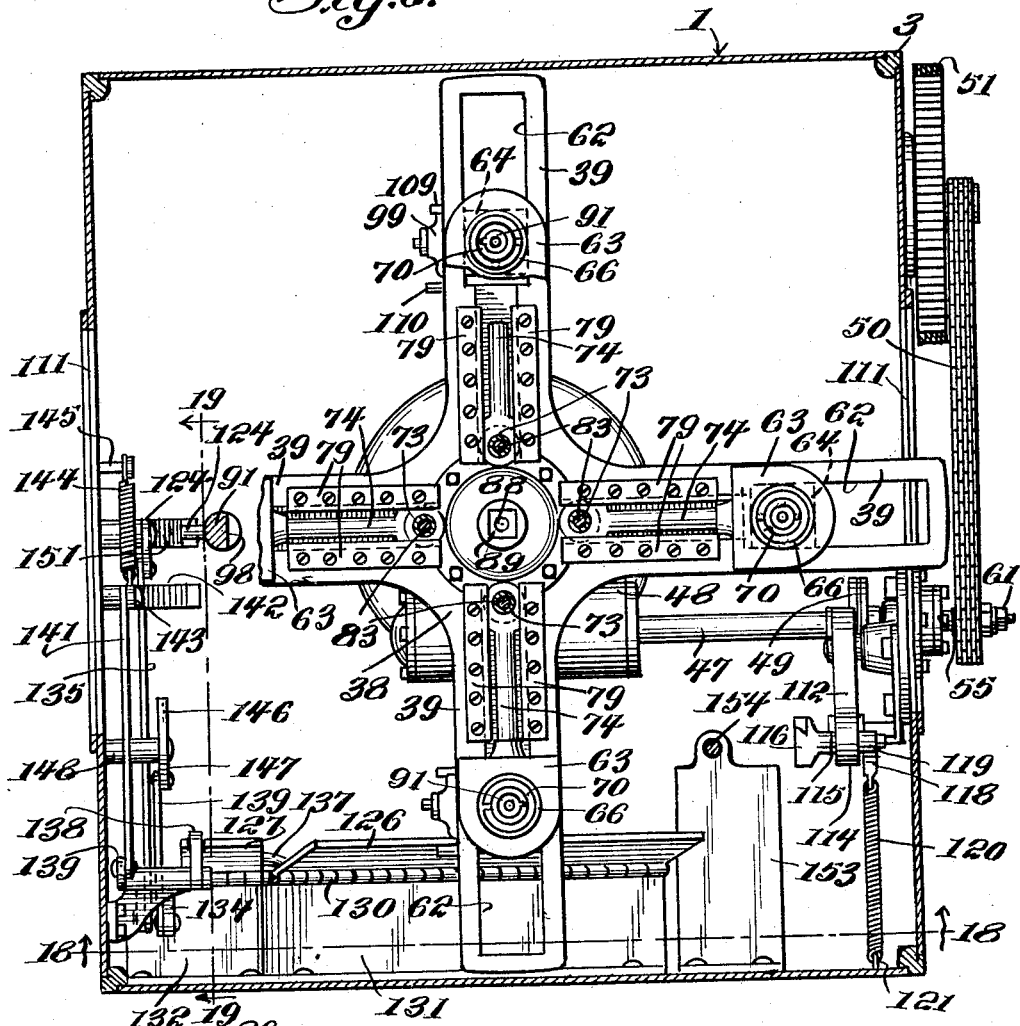

Nov. 22, 1932.　　　C. B. SHELLMAN　　　1,888,938
ICE CUTTING MACHINE
Filed Aug. 8, 1932　　　6 Sheets-Sheet 6
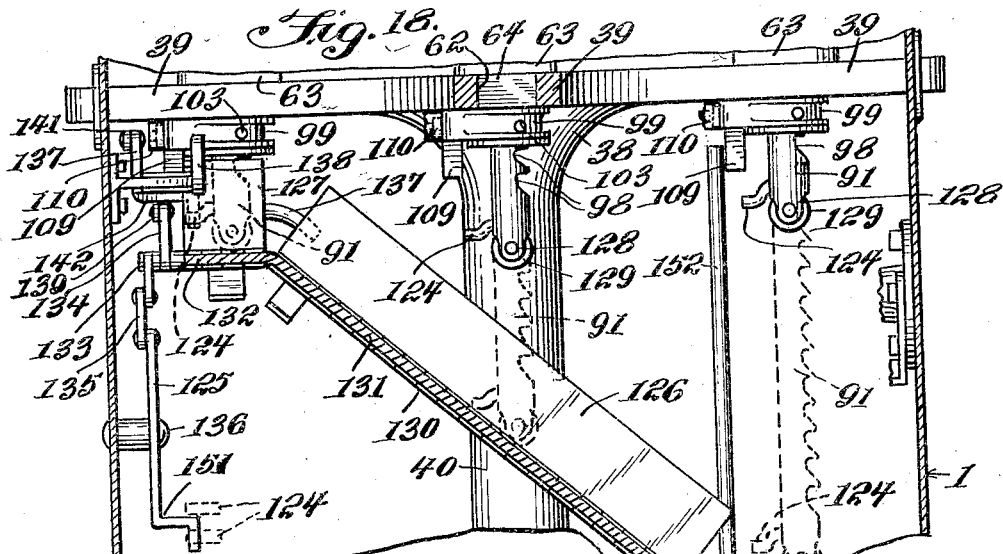
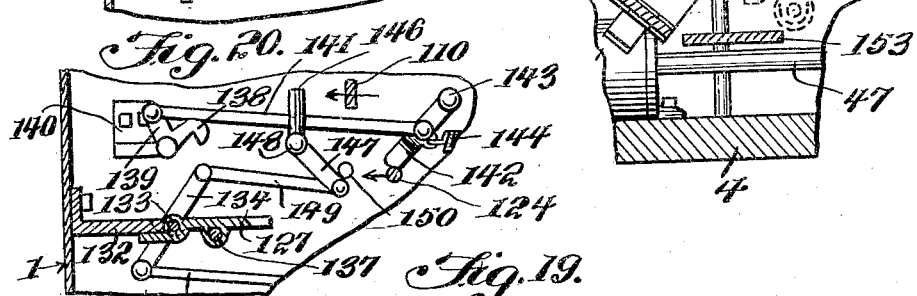
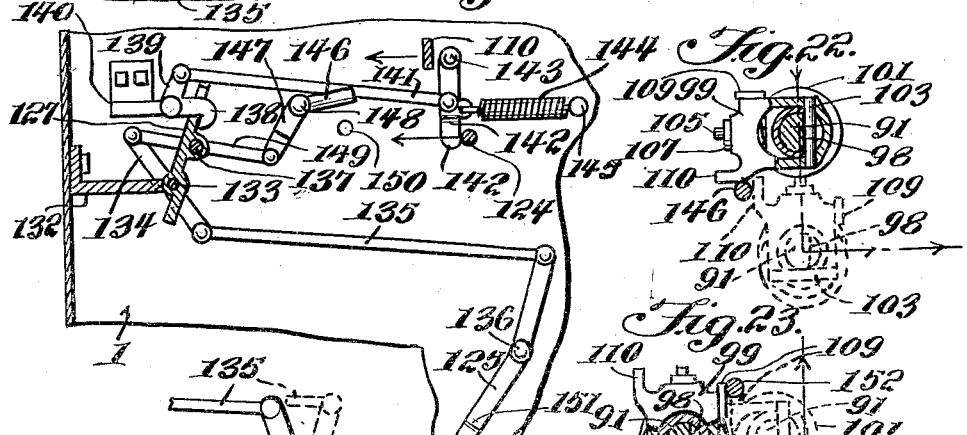
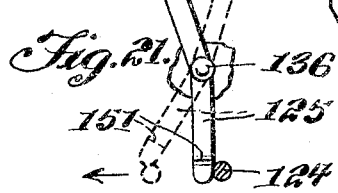
Inventor
Charles B. Shellman
By
Attorney Patented Nov. 22, 1932

1,888,938

UNITED STATES PATENT OFFICE

CHARLES B. SHELLMAN, OF WASHINGTON, DISTRICT OF COLUMBIA

ICE CUTTING MACHINE

Application filed August 8, 1932. Serial No. 627,980.

The invention relates to ice cutting machines.

The object of the present invention is to improve the construction of machines for cutting a cake of ice into small blocks, and to provide a simple, practical and efficient ice cutting machine of strong, durable and comparatively inexpensive construction adapted to receive a plurality of cakes of ice and capable of automatically cutting each of the cakes into small blocks and of discharging the cut blocks into a bag or other suitable receptacle without any liability of the hands of the operator coming in contact with the ice cutting saws whereby all liability of injury to the operator will be entirely eliminated.

A further object of the invention is to provide an ice cutting machine of this character equipped with overhead saws and having means for presenting the tops of a plurality of cakes of ice successively to the saws and after a top section of the cakes of ice has been cut into blocks by the saws, of automatically elevating the cakes successively to arrange the cakes of ice in proper position for cutting after the top has been cut away, whereby the cakes of ice will be completely cut into small blocks or pieces without necessitating any manual feeding or adjustment of the cakes of ice.

Another object of the invention is to provide automatic means adapted to slowly lower the ice supporting devices to reset the said ice supporting devices to receive fresh cakes of ice after a plurality of cakes have been completely cut into small blocks or pieces.

With these and other objects in view, the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings:

Figure 1 is a front elevation of an ice cutting machine constructed in accordance with this invention, Fig. 2 is a side elevation of the same.

Fig. 3 is a vertical sectional view on the line 3—3 of Fig. 2.

Fig. 4 is a horizontal sectional view on the line 4—4 of Fig. 3.

Fig. 5 is a similar view on the line 5—5 of Fig. 3.

Fig. 6 is a horizontal sectional view on the line 6—6 of Fig. 3.

Fig. 7 is a detail horizontal sectional view illustrating the arrangement of the double sprocket chain and gearing for operating the horizontal circular saws.

Fig. 8 is an enlarged detail sectional view illustrating the construction of the means for holding the yieldable ice clamping member in engagement with the ice.

Fig. 9 is a detail sectional view of the worm gearing for actuating the rotary carrier.

Fig. 10 is a detail sectional view illustrating the construction of the friction clutch which is interposed between the driving mechanism and the rotary carrier.

Fig. 11 is a detail sectional view illustrating the manner of mounting the ice containers and the vertically movable support thereof.

Fig. 12 is a detail sectional view of the shiftable automatic locking device for holding the ice support in its vertical adjustment.

Fig. 13 is a detail sectional view illustrating the construction of the shiftable locking device and the dog of the elevating means for engaging the ratchet bar to lift the ice support.

Fig. 14 is a detail horizontal sectional view, the elevating mechanism being shown in plan view.

Fig. 15 is a detail elevation of the elevating mechanism.

Fig. 16 is a detail sectional view on the line 16—16 of Fig. 5.

Fig. 17 is a detail sectional view on the line 17—17 of Fig. 16.

Fig. 18 is a vertical sectional view on the line 18—18 of Fig. 6.

Fig. 19 is a detail vertical sectional view of the mechanism for shifting the locking device to an inoperative position and for lowering the inclined chute to its operative position, the inclined chute being engaged by a catch for holding it in an out of the way position.

Fig. 20 is a similar view, the inclined chute being lowered to its operative position and the shifter being also in an operative position for shifting the locking device.

Fig. 21 is a detail view of the operating lever for swinging the inclined chute to an inoperative position and for lowering the movable shifter to an operative position.

Fig. 22 is a detail sectional view of the shiftable locking device showing the same in full lines in position to be shifted by the movable shifter and in dotted lines shifted out of operative position.

Fig. 23 is a similar view showing the shiftable locking device in full lines in position to be engaged by the fixed shifter and in dotted lines shifted to its operative position.

In the accompanying drawings in which is illustrated the preferred embodiment of the invention, the ice cutting machine is provided with a rectangular casing 1 preferably of slightly greater length from front to rear than in width and constructed of heavy sheet metal or other suitable material and provided with suitable corner posts 3 and having a relatively heavy base 4. The casing is provided above an exterior platform 5 with an opening 6 through which cakes of ice are introduced into the machine for feeding the same to a plurality of holders 7, each consisting of a substantially rectangular container composed of side and front and rear walls, the front wall 8 extending upwardly from the bottom of the holder and terminating short of the center thereof to provide an opening 9 which is exposed at the opening 6 of the casing when the holder is at the front thereof at the said opening 6 to receive a cake of ice. In practice, the holders will be constructed of a size to receive ice in the standard 100 lb. cakes, but the ice cutting machine may, of course, be constructed of any desired dimensions, as will be readily understood. The ice holders are open at the top to expose the top of the ice and enable a top section of the cakes of ice to be presented to gangs of vertical overhead circular saws 10 and 11 and a pair of horizontal circular saws 12 and 13 for cutting vertical grooves or kerfs in the top section of the ice at right angles to divide the top section of the ice into partially severed blocks or pieces and to cut a horizontal groove or kerf to completely sever or separate the partially severed blocks or pieces of ice.

The vertical saws 10 and 11 are arranged at right angles to each other, the gang of vertical saws being preferably located at the center of the right hand side of the machine looking from the front in Fig. 4 of the drawings and the other gang of vertical saws 11 is located at the center of the back of the machine and the horizontal circular saws are located at the center of the left hand side of the machine. The holders with the cakes of ice travel in a rectangular path in a closed circuit indicated by the dot and dash line of Fig. 4, and in the direction of the arrows of the dot and dash line. Each of the holders 7, after receiving a block of ice at the opening 6, moves in a rectilineal path from the front wall of the casing to the rear wall thereof, and during such movement longitudinal grooves or kerfs 14 are cut in the top of the ice. The cakes of ice then without changing its relation to the saws is moved in a rectilineal path from the right hand side of the casing to the left hand side thereof and is operated on by the gang of saws 11 to cut transverse grooves or kerfs 15 in the ice. The holder with its cake of ice then moves forwardly in a straight line from the back of the casing to the front thereof, causing the horizontal circular saws to completely sever the partially severed small blocks or pieces 16 from the cake of ice. The forward movement of the holder and the action of the horizontal saws cause the small pieces or cakes of ice to be delivered on to a discharge chute 17 extending from the horizontal circular saws 12 and 13 to an opening 18 in the front wall of the casing. The front portion of the discharge chute 17 is preferably inclined, as clearly illustrated in Fig. 1 of the drawings, and the platform 5 is adapted to support a bag 19 or other suitable receptacle to receive the small blocks or pieces cut by the machine.

The inner end edge 20 of the chute is preferably beveled as indicated in Fig. 4 of the drawings to form a relatively sharp edge and enable the small blocks or pieces of ice to be readily delivered to the chute. Also the chute is provided with side walls 21 having extensions 22 and 23 at their inner ends for guiding the small blocks or pieces on to the chute 17. These extensions 22 and 23 diverge rearwardly and form a flaring entrance to the chute and facilitate the delivery of the small blocks or pieces to the said chute.

The cakes of ice are yieldably gripped and held against movement in the holders by means of a plate 24 of sheet metal or other suitable material arranged at the inner face of and in spaced relation to one of the sides of the holders and connected with the same by horizontal bolts or screws 25 having threaded inner and outer ends 26 and 27. The inner ends are threaded into openings in the plate 24 and the outer ends of the bolts extend through openings 28 in screw caps 29 threaded into openings in the adjacent side wall of the holders and receiving the outer ends of coiled springs 30 which are interposed between the caps and the plate 24. The outer end of each of the horizontal screws 25 receives a nut 31 adapted to be adjusted to regulate the tension of a spring 30 and to position the plate 24 with relation to the adjacent side wall of the holder. The nut 31 is secured in its adjustment by means of a key 32 adapted to engage notches 33 in the outer end face of the nut 31.

The yieldable ice engaging member is provided at its front edge with a catch 34 consisting of a vertical rib or enlargement beveled at the front at the inner side and forming a shoulder at the back to engage a cake of ice at the front face thereof. The ice engaging member is adapted to yield to permit the cake of ice to be readily introduced into the holder and when the ice is properly placed in the holder the catch 34 of the yieldable member will automatically engage the front face of the cake of ice at one corner thereof and the yieldable member will hold a cake of ice in proper position and prevent any horizontal movement of the same relative to the holder.

The ice holders are guided in their rectangular path around the casing by means of a horizontal guide consisting of an approximately T-shaped rail 35 secured to the inner faces of the walls of the casing and forming a projecting guiding portion which fits in a groove 36 formed by spaced horizontal bars 37 secured to the walls of the holder exteriorly thereof, as clearly illustrated in Fig. 3 of the drawings. One of the walls of each of the holders is always in engagement with the horizontal rail 35 in the movement of the holders in a rectangular path around the casing.

The ice holders which are four in number are mounted on a rotary carrier 38 consisting substantially of a spider and composed of diametrically disposed horizontal supporting arms 39 and a central vertical sleeve 40 mounted for rotation on a fixed vertical central post or standard 41 stepped at its lower end 42 in an opening in the base 4 and keyed or otherwise fixed to the same.

The carrier 38 is supported at the top of the standard 41 for rotation by a roller bearing 43, but bearings of any desired construction may, of course, be employed for mounting the rotary carrier on the fixed standard. The lower end 44 of the sleeve 40 is enlarged and has mounted on it a worm wheel 45 which meshes with the worm 46 of a worm shaft 47. The worm gearing is arranged within a suitable housing 48 mounted upon and suitably secured to the base 4 of the casing of the machine.

The worm shaft 47 is connected by a friction clutch 49 with suitable driving mechanism preferably consisting of chain gearing 50 and 51 extending to an overhead motor 52. The friction clutch 49 is composed of two members consisting of disks having opposed engaging faces. One of the disks is fixed to the worm shaft 47 and the other friction disk is fixed to a tubular shaft or sleeve 53 mounted on a reduced extension 54 of the worm shaft 47. The tubular shaft 53 which has mounted on it a sprocket wheel 55 is counterbored to receive a coiled spring 56 which is interposed between a nut 57 and a shoulder 58 formed by the counterbore of the tubular shaft. The tubular shaft is mounted in a double roller bearing 59 which may be of any desired construction and the nut 57 which is arranged on the threaded outer end 60 of the extension 54 of the worm shaft 47 is adapted to be adjusted to vary the tension of the spring 56 for controlling the friction engagement of the two members of the friction clutch 49.

This provides a slip clutch and prevents any injury either to the mechanism or to the motor should a resistance be encountered which might place too heavy a load on the motor. The threaded outer end 60 of the extension also receives a stop nut 61 designed to limit the outward adjustment of the nut 57 and prevent the same from becoming accidentally disconnected from the extension 54.

The diametrically arranged supporting arms 39 are provided in their outer portions with longitudinal openings 62 for the reception of tubular slides 63 having squared portions 64 to slide in the longitudinal openings 62 of the diametrically arranged supporting arm and having mounted on them the ice holders 7. The tubular slides are enlarged above the rectangular portions 64 to form shoulders or faces 65 to rest upon and slide along the upper faces of the supporting arms 39. The tubular slides are provided at their upper ends with a bearing portion 66 to receive annular flanges 67 of the ice holders 7. The annular flanges 67 are approximately L-shaped in cross section and they extend below the plane of the bottoms of the ice holders and form recesses 68 interiorly of the ice holders for the reception of nuts 69 which engage exteriorly threaded upper ends 70 of the tubular slides. By this construction the ice holders are mounted upon the tubular slides and relative rotary movement is permitted between the slides and the ice holders to enable the supporting arms to rotate around the center post or standard 41 while the ice holders move in a rectangular path around the casing.

The ice holders are caused to move in a rectangular path around the casing during the rotary movement of the carrier, by means of a fixed horizontally disposed approximately star-shaped cam 71 having four diagonally disposed points 72 presenting opposite outwardly converging faces which are engaged by rollers 73 of arms or bars 74 connected at their outer ends to the slides 63. The outer ends 75 of the cam actuated bars 74 are reduced and threaded sockets 76 in the enlarged portions of the slide 63. The inner ends of the cam actuated bars 74 are bifurcated to receive a horizontal roller 77 which operates in inner guides formed by grooves 78 in the inner portions of the supporting arms 39 and by plates 79 secured to the upper faces of the supporting arms 39 and projecting over the grooves 78 as clearly illustrated in Fig. 17 of the drawings. The rollers 73 consist of vertical sleeves extending through bearing openings 80 in the upper and lower sides of the bifurcation 81 of the cam actuated bars, a ball bearing 82 being preferably provided for the horizontal roller 81. A headed pin or bolt 83 extends through the sleeve or roller 73 and the head 84 which is located at the lower end of the pin or screw 83 is countersunk in the lower end of the sleeve or roller 73. The upper threaded end 85 of the pin or screw 83 receives a nut 84 which is located in its adjustment by a key 86, a washer 87 being interposed between the nut and the upper end of the sleeve 73, as clearly illustrated in Fig. 16 of the drawings.

The cam 71 is provided at its lower face with a depending socket 88 which is fitted on a reduced squared portion 89 of the upper end of the central standard 41 and is secured to the said standard 41 by a screw 90 piercing the cam and threaded into the upper end of the standard 41. The standard operates at the fixed spindle and in the rotary movement of the carrier on the standard certain of the inclined faces force the roller 73 and the arms or bars 74 outwardly and the next succeeding inclined faces permit the rollers and the cam actuated bars to move inwardly. This with the rotary movement of the carrier cause the ice holders to travel in a rectangular path around the casing.

The tubular slides which move inwardly and outwardly in the longitudinal openings of the supporting arms receive cylindrical ratchet bars 91 of vertically adjustable ice supports 92 consisting of horizontal plates provided with depending central cylindrical portions 93 receiving upper reduced ends 94 of the cylindrical rack bars 91. The plates 92 are secured to the rack bars by centrally arranged screws 95 and washers 96. The washers are seated in recesses 97 in the plates 92 and the screws extend through the washers and are threaded into the reduced extensions 94 of the cylindrical rack bars. Any other suitable means, however, may be employed for securing the vertical rack bars to the horizontal plates or platform portions of the ice supports.

The cylindrical rack bars are provided at one side with feet 98 which have inclined upper faces and horizontal lower faces, the lower faces being adapted to be engaged by a shiftable locking device 99 mounted for rotary movement on a cylindrical portion 100 of the tubular slide and secured to the same by a nut 101 which engages the threaded lower end 102 of the tubular slide. The shiftable locking device consists of an approximately oblong frame preferably beveled, as shown, and provided at one end with a transverse pin 103 which is adapted to engage the teeth of the cylindrical ratchet bar 70 for holding the vertically adjustable ice support 92 in its successive elevated positions. The locking device is adapted to be turned or rotated through one fourth of a revolution to arrange the pin 103 in position for engaging the ratchet teeth 98 and to carry to one side of the ratchet bar away from the ratchet teeth to permit the ice support to descend from its highest position to its lowest position after a cake of ice has been completely cut into small blocks or pieces by the overhead saws and after the ice support has descended from its elevated position to its initial lowermost position, as hereinafter fully described, the locking device is again rotated through one fourth of a revolution to carry the pin 103 again in position for engaging the rest of the teeth 98 of the ratchet bar.

Within the oblong frame of the shiftable locking device is slidably mounted a spring actuated plunger 104 consisting of a head or body portion and a stem 105, a coiled spring 106 being disposed on the stem and interposed between the head or body portion of the plunger and a hollow plug or screw 107 which is screwed into a threaded opening 108 in one end of the substantially oblong frame or body of the locking device.

The frame of the locking device has a slidable movement relative to the ratchet bar to enable the pin 103 to be disengaged from the ratchet teeth by the rotary movement of the shiftable locking device and also to permit the pin 103 to ratchet over the teeth in the upward movement of the ice support. When the ratchet bar is raised by the means hereinafter described to elevate the ice support, the pin and the frame move outwardly against the action of the spring 106 which causes the frame and pin of the locking device to move inwardly as soon as the tooth has passed the pin 103. The pin automatically engages beneath such tooth and locks the ice support against downward movement. Also the spring actuated plunger operates as a friction device to prevent accidental rotary movement of the shiftable locking device. The shiftable catch is provided at the inner end of the frame at one side thereof with a depending arm 109 and at the opposite side of the inner end of the frame with a horizontally projecting arm 110 adapted to engage shifting means hereinafter described, for automatically turning the locking device to permit the ice supports to descend to their initial position and to reset the locking device after such downward movement of the ice supports.

As the casing is of greater length than width the sides of the casing are provided with horizontal openings 111 to permit the passage of the supporting arms 39 of the rotary carrier. The length of the casing is just sufficient to permit the arms 39 of the rotary carrier to clear the front and rear walls, as indicated by the dot and dash circle in Fig. 5 of the drawings, in which two of the supporting arms 39 are shown projecting through the openings 111 of the sides of the casing.

The carrier in its rotary movement carries the cylindical ratchet bars successively into engagement with an oscillatory lifting arm or lever 112 normally arranged at an inclination, as illustrated in Fig. 15 of the drawings, and pivotally mounted at its lower end to the adjacent side of the casing by means of a roller bearing 113 or other suitable anti-friction bearing, and provided at its upper end with a transverse opening 114 in which is mounted the pivot or shank 115 of a lifting dog 116 adapted to engage successively the teeth of the cylindrical ratchet bars of the rotary carrier which successively brings the cylindrical ratchet bars into engagement with the teeth engaging means of the lifting arm. The lifting arm is preferably provided at the opening 114 with a roller or other anti-friction bearing 117 and the shank or pivot 115 of the lifting dog 116 is provided with an arm 118 extending from a sleeve 119 suitably fixed to the pivot of the dog. The arm 118 is connected to one end of a coiled spring 120 which is secured at its other end to a stud 121 or other fixed portion of the casing. The spring is distended during the lifting movement of the arm which swings through an arc indicated by the dot and dash line in Fig. 15 of the drawings. This is sufficient to elevate the cylindrical rack bar the distance of one tooth to cause the rack bar to be elevated sufficiently to bring another tooth into engagement with the shiftable locking device which maintains the cylindrical rack bar in such elevated position and the continued movement of the arm 39 of the rotary carrier will carry the elevated arm 112 forwardly a sufficient distance to automatically disengage the dog from the engaged tooth of the rack bar, as illustrated in dotted lines in Fig. 15 of the drawings.

When the lifting arm is released from its engagement with the cylindrical rack bar the spring 120 which has been distended by such forward movement of the lifting arm will automatically return the lifting arm to its initial position and carry the lifting arm in engagement with the stop 122 fixed to the casing and preferably provided with a cushion 123 of rubber or other suitable material for cushioning the impact of the elevating arm with the stop. The spring also serves to maintain the engaging portion of the dog in proper position with relation to the engaged tooth, the pivoted connection between the dog and the lifting arm permitting the lifting dog to be maintained in a horizontal position with relation to the shoulder or lower face of the engaged tooth of the cylindrical rack bar during the forward swinging movement of the elevating arm.

The continued rotary movement of the rotary carrier will through the elevating arms cause the ice supports to be elevated to the limit of their upward movement, as indicated at the right hand side of Fig. 18 of the drawings. This also operates to elevate a fixed finger 124 projecting from the lower portion of each of the cylindrical ratchet bars and adapted, as illustrated in Fig. 21 of the drawings, to engage an operating lever 125 for lowering an inclined chute 126 and a horizontal platform section 127 from a raised out of the way position to an operative position in the path of the cylindrical ratchet bars which as they reach the platform section 127, are released from engagement with the shiftable locking devices to cause the ice supports to descend to their initial position.

This operation takes place during the movement of the ice holders across the front of the casing and the inclined chute 126 receives the cylindrical ratchet bar and permits the same to slide downward gently through the tubular slides 63. The lower ends 128 of the cylindrical ratchet bars are bifurcated to receive anti-friction rollers 129 which are adapted to roll on the inclined chute 126 in the downward movement of the ice supports.

The inclined chute 126 is connected by a suitable hinge joint 130 with a bracket member 131 provided with an angularly disposed attaching flange suitably secured to the inner face of the front wall of the casing. The platform section 127 is connected by a suitable hinge joint with a bracket 132 and also provided with an angularly related attaching flange secured to the inner face of the front side wall of the casing. The hinge connection between the platform section 127 and the bracket 132 is provided with a pintle 133 rigid with the platform section 127 and having fixed to one end of it a lever 134 extending above and below the bracket 132. The lower arm of the lever 134 is connected by a link 135 with the operating lever 125 which is fulcrumed intermediate of its ends by a suitable pivot 136. The operating lever extends above and below the pivot 136 with its upper arm which is pivotally connected to the said link 135 and the lower arm is adapted to be engaged by the fingers 124 of the cylindrical ratchet bars. The fingers of the cylindrical ratchet bars are adapted to move the operating lever from the full line position indicated in Fig. 21 to the dotted line position shown in the said figure and this movement lifts the hinged platform section 127 which is provided with a curved arm 137 which extends beneath the upper end of the inclined chute 126 when the latter is in its operative position, whereby when the hinged platform section 127 is raised by the operating lever and its connections with the said hinged platform section 127 the inclined chute will also be raised to an inoperative position out of the way of the cylindrical ratchet bars.

The inclined chute 126 and the hinged platform section 127 are maintained in their raised or out of the way position by means of a catch 138 carried by a bell crank lever 139 fulcrumed at its angle on the bracket 140. The catch is carried by one arm of the bell crank lever 139 and the other arm of the bell crank lever is connected by a link 141 with a tripping lever 142 fulcrumed at its upper end by a suitable pivot 143 and interiorly connected intermediate of its ends with the said link 141 and with the coiled spring 144. One end of the coiled spring is connected to the tripping lever 142 and its other end is secured to a fixed stud 145 projecting from the adjacent side of the casing, as clearly illustrated in Fig. 19 of the drawings, but the coiled spring may be mounted in any other desired manner, as will be readily understood. The roller end of the tripping lever 142 is adapted to be engaged by the finger 124 of the cylindrical ratchet bar when the latter is in its elevated position, as illustrated in dotted lines in Fig. 18 of the drawings. The finger 124 is adapted to swing the tripping lever 142 in the direction of the lower arrow in Fig. 19 of the drawings to elevate the catch 138 and release the hinged platform section 127 and the inclined chute 126 which drop by gravity into their operative positions to receive the cylindrical ratchet bar which is released by a movable shifter 146.

The movable shifter 146 is formed by an upwardly extending arm of an angle lever 147 fulcrumed at its angle by a suitable pivot 148. The movable shifter 146 extends upwardly from the pivot and is vertical when in operative position, as illustrated in Fig. 20 of the drawings. The other arm of the lever 147 extends downwardly and is connected by a link 149 with the upwardly extending arm of the lever 134 so that when the platform section 127 is swung downwardly into its horizontal opposite position the lower arm of the lever 147 will be carried rearwardly into engagement with the stop 150. This movement elevates the movable shifter from the inclined substantially horizontal position illustrated in Fig. 19 of the drawings, to the vertical position shown in Fig. 20 and carries the pivoted shifter 146 into the path of the horizontal projecting arm 110 of the shiftable locking device which is partially rotated by contact with the movable shifter 146 from the full line position shown in Fig. 22 to the dotted line position illustrated in that figure.

This partial rotation of the shiftable locking device carries the pin 103 from its engaging position away from the ratchet teeth of the cylindrical ratchet bar to a position at one side of the said bar. This operation releases the ice support and permits the same to move downwardly from the elevated position illustrated in dotted lines at the left hand side of Fig. 18 of the drawings to the dotted line position of the cylindrical ratchet bar at the right hand side of Fig. 18 of the drawings. During this downward movement of the cylindrical ratchet bar its roller 129 will roll down the inclined chute so that the vertically adjustable ice support will be lowered without any jar from its elevated position to its lowermost initial position.

After the cylindrical ratchet bar has been lowered from its elevated position to its initial position the rotary carrier will carry the finger 124 of the lowered cylindrical ratchet bar into engagement with the lower end of the operating lever 124, as illustrated in dotted lines in Fig. 18 of the drawings. The lower end of the operating lever is angularly bent at 151 to inwardly offset the engaged portion of the operating lever from the plane of the body portion of the same so that the finger 124 the second time it moves around the casing and each succeeding time will be located above the engaged lower end of the operating lever 125 and the latter will not interfere with the rotation of the carrier 38. The stop 150 maintains the movable shifter rigid during its contact with the horizontal projecting arm 110 of the shiftable locking device.

The shiftable locking device is returned to its normal operative position by means of a fixed shifter 152 consisting of a vertical rod rising from the base 4 of the casing and extending upwardly into the path of the depending arm 109 when the shiftable locking device is in its inoperative position, as illustrated in Fig. 23 of the drawings, and the fixed shifter 152 will cause a partial rotation of the shiftable locking device which will be moved from the full line position illustrated in Fig. 23 of the drawings to the dotted line position shown in the said figure.

During this movement of the shiftable locking device the cylindrical ratchet bar is supported by a fixed platform section 153 which prevents the weight of the ice support and the cylindrical ratchet bar from interfering with the turning movement of the shiftable locking device by the fixed shifter rod 152. The fixed platform section 153 is provided at one end with an attaching flange which is secured to the inner face of the front wall of the casing and the other end of the fixed platform section 153 is provided with an ear 154 through which passes the fixed vertical shifter rod 152. The gang saws 10 are mounted on a horizontal shaft 155 journaled in suitable bearings of hangers 157 preferably constituting a portion of a housing 158 for chain gearing 159 which connects the shaft 155 with the shaft 160 of an electric motor 161 mounted upon the top of the casing. Any suitable housing may be provided for the gearing and the gang of saws 11 which are arranged in planes at right angles to the planes of the saws 10 are carried by a shaft 162 which is connected by chain gearing 163 with an electric motor 164, a suitable housing 165 being provided for the chain gearing 163.

The horizontal saws 12 and 13 are mounted on vertical shafts 165 and 166 journaled in suitable bearings 167 and 168 of a sectional housing 169 hung from the top of the casing, as clearly illustrated in Fig. 3 of the drawings. The horizontal circular saws are driven by an electric motor 170 having a shaft 171 connected by chain gearing comprising a double faced sprocket chain 172, and sprocket wheels 173, 174 and 175 mounted on the motor shaft 173 and the shafts 165 and 166 of the horizontal circular saw.

The sprocket chain also meshes with an idler sprocket wheel 176 spaced from the sprocket wheel 174 and located adjacent the same. The sprocket chain 172 is arranged in substantially L-shaped formation, as clearly illustrated in Fig. 7 of the drawings, the inner teeth 177 meshing with the sprocket wheels 173, 175 and 176, and the outer teeth 178 meshing with the sprocket wheel 174. The sprocket wheel 174 of the shaft 165 is arranged exteriorly of the sprocket chain 172 and the other sprocket wheels are arranged between the sides or stretches of the sprocket chain. While four electric motors are illustrated in the accompanying drawings for operating the rotary carrier and the saws of the ice cutting machine, one or more motors may, of course, be employed, and any suitable arrangement of gearing may be provided for connecting the circular saws with the motor or motors.

What is claimed is:

1. An ice cutting machine including spaced gangs of vertical overhead circular saws arranged in planes at right angles to each other, said vertical saws being adapted to cut series of grooves in a cake of ice at right angles to one another to divide a section of the cake of ice into small blocks and partially sever the same, horizontal sawing means arranged to completely sever the partially severed blocks of ice from the cake, means traveling in a closed circuit for feeding a cake of ice to present the top of the ice successively to the said saws and sawing means while moving parallel to the planes thereof, and means for elevating the cake of ice to cut successive sections of the cake into small blocks.

2. An ice cutting machine including spaced gangs of vertical overhead circular saws arranged in planes at right angles to each other, said vertical saws being adapted to cut series of grooves in a cake of ice at right angles to one another to divide a section of the cake of ice into small blocks and partially sever the same, horizontal sawing means arranged to completely sever the partially severed blocks of ice from the cake, and means for moving a cake of ice in a substantially rectangular path to feed the cake successively to the saws and sawing means in substantially a fixed relation to the same to cause the saws to first cut parallel grooves in the cake of ice in one direction and then cut parallel grooves in the cake at right angles to the first mentioned grooves and finally cut a horizontal kerf to sever small blocks of ice from the cake.

3. An ice cutting machine including spaced gangs of vertical overhead circular saws arranged in planes at right angles to each other, said vertical saws being adapted to cut series of grooves in a cake of ice at right angles to one another to divide a section of the cake of ice into small blocks and partially sever the same, horizontal sawing means arranged to completely sever the partially severed blocks of ice from the cake, means for moving a cake of ice in a substantially rectangular path to feed the cake successively to the saws and sawing means in substantially a fixed relation to the same to cause the saws to first cut parallel grooves in the cake of ice in one direction and then cut parallel grooves in the cake at right angles to the first mentioned grooves and finally cut a horizontal kerf to sever small blocks of ice from the cake, and a fixed discharge chute arranged in the path of the severed blocks to cause the same to be delivered to the chute by the advancing cake and the action of the horizontal saws.

4. An ice cutting machine including spaced gangs of vertical overhead circular saws arranged in planes at right angles to each other, said vertical saws being adapted to cut series of grooves in a cake of ice at right angles to one another to divide a section of the cake of ice into small blocks and partially sever the same, a pair of horizontal circular saws arranged to completely sever the partially severed blocks of ice from the cake, means for moving a cake of ice in a substantially rectangular path to feed the cake successively to the saws in substantially a fixed relation to the same to cause the saws to first cut parallel grooves in the cake of ice in one direction and then cut parallel grooves in the cake at right angles to the first mentioned grooves and finally cut a horizontal kerf to sever small blocks of ice from the cake, and means for elevating the cake of ice at the end of each complete cutting operation to cut successive sections of the cake of ice into small blocks.

5. A saw cutting machine including spaced gangs of overhead vertical saws arranged in planes at right angles to one another, horizontal sawing means arranged to completely sever from a cake of ice small blocks or pieces partially severed by the vertical saws, and means for successively feeding to the said saws a plurality of cakes of ice in a rectangular path and of presenting the tops of the cakes of ice to the saws and sawing means to cut a section of ice at the top of each cake into small pieces.

6. A saw cutting machine including spaced gangs of overhead vertical saws arranged in planes at right angles to one another, horizontal sawing means arranged to completely sever from a cake of ice small blocks or pieces partially severed by the vertical saws, means for successively feeding to the said saws a plurality of cakes of ice in a rectangular path and of presenting the tops of the cakes of ice to the saws and sawing means to cut a section of ice at the top of each cake into small pieces, and means for automatically elevating the cakes of ice, successively, for cutting the entire cakes into small blocks.

7. An ice cutting machine including spaced gangs of overhead vertical saws arranged to cut grooves into the top of a cake of ice at right angles to one another to form small blocks of ice, horizontal sawing means arranged to completely sever said small blocks of ice from the cakes, a rotary carrier, a plurality of holders mounted on the rotary carrier for the reception of cakes of ice, and mechanism for causing the holders to travel in a rectangular path when the carrier is rotated to present the tops of the cakes of ice to the saws and sawing means in a relatively fixed relation to the same.

8. An ice cutting machine including spaced gangs of overhead vertical saws arranged to cut grooves into the top of a cake of ice at right angles to one another to form small blocks of ice, horizontal sawing means arranged to completely sever said small blocks of ice from the cakes, a rotary carrier, a plurality of holders mounted on the rotary carrier for the reception of cakes of ice, mechanism for causing the holders to travel in a rectangular path when the carrier is rotated to present the tops of the cakes of ice to the saws and sawing means in a relatively fixed relation to the same, and means for automatically elevating each of the cakes of ice after the blocks have been completely severed from the cakes by the said horizontal sawing means.

9. An ice cutting machine including overhead saws for cutting small blocks of ice from the top of a cake, a rotary carrier, holders for cakes of ice movably mounted on the carrier for presenting the tops of cakes to the saws, a rectangular guide for the holders, and mechanism for causing the holders to travel along the rectangular guide when the carrier is rotated, whereby the cakes are fed to the saws, successively, in relatively fixed relation to the same.

10. An ice cutting machine including overhead saws for cutting small blocks of ice from the top of a cake, a rotary carrier, holders for cakes of ice movably mounted on the carrier for presenting the tops of cakes to the saws, a rectangular guide for the holders, mechanism for causing the holders to travel along the rectangular guide when the carrier is rotated, whereby the cakes are fed to the saws, successively, in relatively fixed relation to the same, and means located at a fixed point along the guide for automatically elevating the cakes to cause the saws to cut successive sections of the cakes of ice into small blocks.

11. An ice cutting machine including overhead saws for cutting small blocks of ice from the top of a cake, a rotary carrier, holders for cakes of ice movably mounted on the carrier for presenting the tops of cakes to the saws, a rectangular guide for the holders, and mechanism for causing the holders to travel along the rectangular guide when the carrier is rotated, whereby the cakes are fed to the saws, successively, in relatively fixed relation to the same, said mechanism comprising a fixed star cam having diagonally arranged points, and cam actuated and controlled bars engaged by the cam and connected with the holders.

12. An ice cutting machine including saws for cutting small blocks of ice from the top of a cake, a rotary carrier provided with diametrically arranged guides, holders for cakes of ice slidable in the guides and adapted to present the tops of the cakes to the saws, a fixed rectangular guide for the holders, and mechanism for causing the holders to travel along the fixed rectangular guide to maintain the cakes of ice in relatively fixed relation to the saw, said mechanism including a fixed star cam having diagonally arranged points, and cam actuated and controlled bars engaged by the cam and connected with the holders.

13. An ice cutting machine including overhead saws for cutting small blocks of ice from the top of a cake, a rotary carrier provided with diametrically arranged guides, slides operating the guides of the rotary carrier, holders for cakes of ice mounted in the slides, and mechanism for causing the holders to travel in a rectangular path to present the tops of the cakes of ice, successively, to the overhead saws, said mechanism including a fixed star cam having diagonally arranged points, and cam actuated and controlled bars connected with the slides and engaged by the said cam.

14. An ice cutting machine including overhead saws for cutting small blocks of ice from the top of a cake, a rotary carrier provided with diametrically arranged guides, slides operating in the guides of the rotary carrier, holders for cakes of ice mounted in the slides, and mechanism for causing the holders to travel in a rectangular path to present the tops of the cakes of ice, successively, to the overhead saws, said mechanism including a fixed star cam having diagonally arranged points, cam actuated and controlled bars connected with the slides and engaged by the said cam, and means for connecting the slides with the holders to permit relative rotary movement of the slides and the holders.

15. An ice sawing machine including overhead saws for cutting small blocks of ice from the top of a cake, a rotary carrier provided with diametrically arranged guides, slides operating in the diametrically arranged guides, holders for cakes of ice carried by the slides, said holders and slides having coactive means for permitting relative rotary movement of the slides and the holders, a fixed rectangular guide for the holder, and mechanism for causing the holders to travel in a rectangular path along the fixed guide comprising a fixed star cam having diagonally disposed points, and cam actuated and controlled bars connected with the slides and engaged by the cam.

16. An ice sawing machine including overhead saws for cutting small blocks of ice from the top of a cake, a fixed vertical post, a rotary carrier mounted on the post and provided with diametrically arranged guides, slides mounted on the carrier and operating in the guides thereof, holders for cakes of ice mounted upon the slides, and means for causing the holders to travel in a rectangular path including a fixed rectangular guide, a stationary cam mounted on the post, and cam actuated and controlled bars connected with the slides and engaged by the cam.

17. An ice sawing machine including overhead saws for cutting small blocks of ice from the top of a cake, a fixed vertical post, a rotary carrier mounted on the post and provided with diametrically arranged guides, slides mounted on the carrier and operating in the guides thereof, holders for cakes of ice mounted upon the slides, means for rotating the said carrier including a shaft, worm gearing connecting the shaft with the carrier, a motor, and chain gearing connecting the shaft with the motor, and means for causing the holders to travel in a rectangular path including a fixed rectangular guide, a stationary cam mounted on the post, and cam actuated and controlled bars connected with the slides and engaged by the cam.

18. An ice sawing machine including overhead saws for cutting small blocks of ice from the top of a cake, an ice holder, means for moving the ice holder horizontally for feeding the cake of ice to the saws beneath the same, and means for automatically elevating the cake of ice to present successive sections of the cake to the saws, said means comprising a vertically movable ice support carried by the ice holder, and an oscillatory lifting arm arranged in the path of the support and engageable with the support during a portion of the movement of the same to lift the said support.

19. An ice sawing machine including overhead saws for cutting small blocks of ice from the top of a cake, an ice holder, means for moving the ice holder horizontally for feeding the cake of ice to the saws beneath the same, and means for automatically elevating the cake of ice to present successive sections of the cake to the saws, said means comprising a vertically movable ice support carried by the ice holder, an oscillatory lifting arm arranged in the path of the support and engageable with the support during a portion of the movement of the same to lift the said support, and an automatic locking device for holding the support against downward movement.

20. An ice sawing machine including overhead saws for cutting small blocks of ice from the top of a cake, an ice holder, means for moving the ice holder horizontally for feeding the cake of ice to the saws beneath the same, and means for automatically elevating the cake of ice to present successive sections of the cake to the saws, said means comprising a vertically movable ratchet bar, an oscillatory lifting arm having a dog arranged to engage with the teeth of the ratchet bar to lift the same, and an automatically operating locking device arranged to engage the teeth of the ratchet bar to hold the same against downward movement.

21. An ice sawing machine including overhead saws for cutting small blocks of ice from the top of a cake, an ice holder, means for moving the ice holder horizontally for feeding the cake of ice to the saws beneath the same, and means for automatically elevating the cake of ice to present successive sections of the cake to the saws, said means comprising a vertically movable ratchet bar, an oscillatory lifting arm, a dog pivotally mounted on the lifting arm and having a horizontally disposed portion for engaging the teeth of the ratchet bar to lift the latter during the movement of the lifting arm in one direction, and a spring connected with the pivoted dog for maintaining the same in position for engaging the ratchet bar and for also swinging the arm in the other direction.

22. An ice sawing machine including overhead saws for cutting small blocks of ice from the top of a cake, an ice holder, means for moving the ice holder horizontally for feeding the cake of ice to the saws beneath the same, and means for automatically elevating the cake of ice to present successive sections of the cake to the saws, said means comprising a vertically movable cylindrical ratchet bar having teeth at one side, a pivoted lifting arm provided with means for engaging the teeth of the ratchet bar to lift the latter when the arm is swung, an automatic locking device engaging the teeth of the ratchet bar for holding the ratchet bar against downward movement, and means for rotating the locking device to move the same to and from a position for engaging the teeth of the ratchet bar.

23. An ice cutting machine including overhead saws for cutting small blocks or pieces of ice from the top of a cake, an ice holder, means for moving the ice holder horizontally in a rectangular path to feed a cake of ice to the overhead saws and to present the top of the cake to the same, a vertically adjustable ice support carried by the holder and provided with a depending vertical ratchet bar, a pivotally mounted lifting arm provided with means located in the path of the ratchet bar and adapted to engage the teeth thereof to swing the lifting arm and to cause the same to elevate the ice support, and means for automatically locking the ice support in each adjustment thereof.

24. An ice cutting machine including overhead saws for cutting small blocks or pieces of ice from the top of a cake, an ice holder, means for moving the ice holder horizontally in a rectangular path to feed a cake of ice to the overhead saws and to present the top of the cake to the same, a vertically adjustable ice support carried by the holder and provided with a depending vertical ratchet bar, a pivotally mounted lifting arm provided with means located in the path of the ratchet bar and adapted to engage the teeth thereof to swing the lifting arm and to cause the same to elevate the ice support, a shiftable locking device arranged to engage the teeth of the ratchet bar for holding the latter and the ice support against downward movement, means located in the path of the locking device and arranged to automatically shift the same to throw it out of operation when the ratchet bar reaches the limit of its vertical movement to permit the ratchet bar to move downwardly to its initial position, and separate means located in the path of the locking device for shifting the same to return it to its engaging position after the ratchet bar and the holder have moved downwardly to the said initial position of the same.

25. An ice cutting machine including overhead saws for cutting small blocks or pieces of ice from the top of a cake, an ice holder, means for moving the ice holder horizontally in a rectangular path to feed a cake of ice to the overhead saws and to present the top of the cake to the same, a vertically adjustable ice support carried by the holder and provided with a depending vertical ratchet bar, a pivotally mounted lifting arm provided with means located in the path of the ratchet bar and adapted to engage the teeth thereof to swing the lifting arm and to cause the same to elevate the ice support, a shiftable locking device arranged to engage the teeth of the ratchet bar for holding the latter and the ice support against downward movement, means located in the path of the locking device and arranged to automatically shift the same to throw it out of operation when the ratchet bar reaches the limit of its vertical movement to permit the ratchet bar to move downwardly to its initial position, separate means located in the path of the locking device for shifting the same to return it to its engaging position after the ratchet bar and the holder have moved downwardly to the said initial position of the same, and means for controlling the downward movement of the support and the ratchet bar.

26. An ice cutting machine including overhead saws for cutting small blocks or pieces of ice from the top of a cake, an ice holder, means for moving the ice holder horizontally in a rectangular path to feed a cake of ice to the overhead saws and to present the top of the cake to the same, a vertically adjustable ice support carried by the holder and provided with a depending vertical ratchet bar, a pivotally mounted lifting arm provided with means located in the path of the ratchet bar and adapted to engage the teeth thereof to swing the lifting arm and to cause the same to elevate the ice support, a shiftable locking device arranged to engage the teeth of the ratchet bar for holding the latter and the ice support against downward movement, means located in the path of the locking device and arranged to automatically shift the same to throw it out of operation when the ratchet bar reaches the limit of its vertical movement to permit the ratchet bar to move downwardly to its initial position, and separate means located in the path of the locking device for shifting the same to return it to its engaging position after the ratchet bar and the holder have moved downwardly to the said initial position of the same, an inclined chute arranged to support and control the downward movement of the ratchet bar and the ice support.

27. An ice cutting machine including overhead saws for cutting small blocks or pieces of ice from the top of a cake, an ice holder, means for moving the ice holder horizontally in a rectangular path to feed a cake of ice to the overhead saws and to present the top of the cake to the same, a vertically adjustable ice support carried by the holder and provided with a depending vertical ratchet bar, a pivotally mounted lifting arm provided with means located in the path of the ratchet bar and adapted to engage the teeth thereof to swing the lifting arm and to cause the same to elevate the ice support, a shiftable locking device for holding the ratchet bar against downward movement and shiftable to and from a position for engaging the ratchet bar, a movable shifter for engaging the locking device to move the same out of operative position, a stationary shifter arranged in the path of the locking device for moving the same into position for engaging the ratchet bar, and means actuated by the ratchet bar when the same is at the limit of its upward movement for moving the movable shifter into the path of the locking device.

28. An ice cutting machine including overhead saws for cutting small blocks or pieces of ice from the top of a cake, an ice holder, means for moving the ice holder horizontally in a rectangular path to feed a cake of ice to the overhead saws and to present the top of the cake to the same, a vertically adjustable ice support carried by the holder and provided with a depending vertical ratchet bar, a pivotally mounted lifting arm provided with means located in the path of the ratchet bar and adapted to engage the teeth thereof to swing the lifting arm and to cause the same to elevate the ice support, a shiftable locking device for holding the ratchet bar against downward movement and shiftable to and from a position for engaging the ratchet bar, a finger projecting from the lower portion of the ratchet bar, a movable shifter arranged in the path of the said finger when the ratchet bar is at the limit of its upward movement, means for normally holding the movable shifter in an inoperative position, and mechanism including a tripping lever arranged in the path of the finger and adapted to be operated by the same to carry the movable shifter into the path of the said finger.

29. An ice cutting machine including overhead saws for cutting small blocks or pieces of ice from the top of a cake, an ice holder, means for moving the ice holder horizontally in a rectangular path to feed a cake of ice to the overhead saws and to present the top of the cake to the same, a vertically adjustable ice support carried by the holder and provided with a depending vertical ratchet bar, a pivotally mounted lifting arm provided with means located in the path of the ratchet bar and adapted to engage the teeth thereof to swing the lifting arm and to cause the same to elevate the ice support, a shiftable locking device for holding the ratchet bar against downward movement and shiftable to and from a position for engaging the ratchet bar, a finger projecting from the lower portion of the ratchet bar, a movable shifter arranged in the path of the said finger when the ratchet bar is at the limit of its upward movement, means for normally holding the movable shifter in an inoperative position, and mechanism including an operating lever arranged in the path of the said finger when the ratchet bar is at the limit of its downward movement to carry the movable shifter out of the path of the said finger.

30. An ice cutting machine including overhead saws for cutting small blocks of ice from the top of a cake, a rotary carrier, holders mounted on the rotary carrier for holding a plurality of blocks of ice, vertically movable supports carried by the holders and adapted to receive the cakes of ice and provided with depending ratchet bars, means located in the path of the ratchet bars for engaging the same to lift the ratchet bars, successively, and intermittently to present successive sections of the cakes of ice to the saws, shiftable locking devices mounted on the carrier and engaging the ratchet bars for holding the same against downward movement and movable to a position to release the ratchet bars to permit the supports to move downwardly after the ratchet bars have reached the limit of their upward movement, a movable shifter normally arranged out of the path of the locking devices, fingers projecting from the lower portions of the ratchet bars, and means located in the path of the fingers when the ratchet bars are at the limit of their upward movement for causing the movable shifter to be moved into the path of the locking devices.

31. An ice cutting machine including overhead saws for cutting small blocks of ice from the top of a cake, a rotary carrier, holders mounted on the rotary carrier for holding a plurality of blocks of ice, vertically movable supports carried by the holders and adapted to receive the cakes of ice and provided with depending ratchet bars, means located in the path of the ratchet bars for engaging the same to lift the ratchet bars, successively, and intermittently to present successive sections of the cakes of ice to the saws, shiftable locking devices mounted on the carrier and engaging the ratchet bars for holding the same against downward movement and movable to a position to release the ratchet bars to permit the supports to move downwardly after the ratchet bars have reached the limit of their upward movement, a movable shifter normally arranged out of the path of the locking devices, fingers projecting from the lower portions of the ratchet bars, means located in the path of the fingers when the ratchet bars are at the limit of their upward movement for causing the movable shifter to be moved into the path of the locking devices, and a stationary shifter consisting of a vertical rod arranged in the path of the locking devices and adapted to return the same to a position for engaging the ratchet bars.

32. An ice cutting machine including overhead saws for cutting small blocks of ice from the top of a cake, a rotary carrier, holders mounted on the rotary carrier for holding a plurality of blocks of ice, vertically movable supports carried by the holders and adapted to receive the cakes of ice and provided with depending ratchet bars, means located in the path of the ratchet bars for engaging the same to lift the ratchet bars, successively, and intermittently to present successive sections of the cakes of ice to the saws, shiftable locking devices mounted on the carrier and engaging the ratchet bars for holding the same against downward movement and movable to a position to release the ratchet bars to permit the supports to move downwardly after the ratchet bars have reached the limit of their upward movement, a hinged inclined chute adapted to swing into and out of position for supporting the ratchet bars to control the downward movement thereof when the locking devices are disengaged from the ratchet bars, a hinged platform section having an arm arranged to engage the chute to move the same out of the path of the ratchet bars, fingers projecting from the lower portions of the ratchet bars, operating mechanism connected with the hinged platform section for moving the latter and the chute to an inoperative position, said mechanism including an operating lever adapted to be engaged by the fingers of the ratchet bars when the latter are at the limit of their downward movement, and a movable shifter adapted to be carried into the path of the locking devices for moving the same to an inoperative position, a catch for holding the hinged platform section and the chute in their inoperative positions, and a tripping lever connected with the catch and arranged in the path of the said fingers when the ratchet bars are at the limit of their upward movement to release the platform section and the inclined chute to permit the same to return to their operative positions.

33. An ice cutting machine including overhead saws for cutting small blocks of ice from the top of a cake, an ice holder consisting of a container of a form to receive a block of ice and open at the top and at the upper portion of its front wall to permit a cake of ice to be introduced to the container, a yieldable ice clamping member mounted within the container and located at one side thereof and provided at the open front with a catch for engaging a cake of ice at the front thereof, and means for moving the holder for feeding the cake of ice to the saws.

34. An ice cutting machine including overhead saws for cutting small blocks of ice from the top of a cake, an ice holder, means for moving the ice holder horizontally for feeding a cake of ice to the saws beneath the same, a vertically adjustable support operating within the holder and having a depending cylindrical ratchet bar provided at one of its sides with ratchet teeth, means for engaging the ratchet teeth to intermittently elevate the support, an automatic locking device for holding the ratchet bar against downward movement, said locking device comprising a frame through which the ratchet bar passes, means carried by the frame at one end thereof for normally engaging the teeth of the ratchet bar, a spring actuated plunger mounted within the frame at the opposite end thereof for yieldably maintaining the locking device in engagement with the ratchet bar, and means for partially rotating the locking device to move the engaging portion thereof away from the ratchet teeth to permit the support to move downwardly and for returning the engaging portion to the ratchet teeth after the support has reached the limit of its downward movement.

In testimony whereof I have hereunto set my hand.

CHARLES B. SHELLMAN.